(12) United States Patent
Choi

(10) Patent No.: US 6,252,835 B1
(45) Date of Patent: Jun. 26, 2001

(54) APPARATUS FOR AUTOMATICALLY ADJUSTING FOCUS OFFSET AND METHOD THEREOF IN A DISC PLAYER

(75) Inventor: Young-Do Choi, Seoul (KR)

(73) Assignee: L G Electronics Inc, Seoul (KR)

( * ) Notice: Subject to any disclaimer, the term of this patent is extended or adjusted under 35 U.S.C. 154(b) by 0 days.

(21) Appl. No.: 09/369,246

(22) Filed: Aug. 5, 1999

Related U.S. Application Data

(63) Continuation-in-part of application No. 08/927,016, filed on Sep. 16, 1997, now Pat. No. 6,028,825.

(51) Int. Cl.[7] .................................................. G11B 7/09
(52) U.S. Cl. .............................. 369/44.29; 369/44.35
(58) Field of Search ........................... 369/44.35, 44.36, 369/44.29, 54, 44.25

(56) References Cited

U.S. PATENT DOCUMENTS

| | | |
|---|---|---|
| 4,497,047 | 1/1985 | Fujiie et al. . |
| 4,543,650 | 9/1985 | Wachi . |
| 4,703,468 | 10/1987 | Baba et al. . |
| 4,747,089 | 5/1988 | Eguchi et al. . |
| 4,823,330 * | 4/1989 | Arter et al. ........................ 369/44.35 |
| 4,918,680 | 4/1990 | Miyasaka . |
| 4,924,455 | 5/1990 | Fujiie et al. . |
| 4,955,010 | 9/1990 | Nabeshima . |
| 4,992,652 | 2/1991 | Okada . |
| 5,060,215 | 10/1991 | Kawamura et al. .............. 369/44.79 |
| 5,202,871 | 4/1993 | Yokota ............................. 369/44.29 |
| 5,379,282 | 1/1995 | Wachi .............................. 369/44.75 |
| 5,475,664 * | 12/1995 | Shimizume et al. .............. 369/44.29 |
| 5,610,886 | 3/1997 | Hayashi et al. .................. 369/44.35 |
| 5,642,340 | 6/1997 | Nomura ........................... 369/44.25 |
| 5,663,942 | 9/1997 | Ishibashi et al. ................. 369/44.36 |
| 5,748,584 | 5/1998 | Maezawa .......................... 369/44.35 |
| 5,751,675 * | 5/1998 | Tsutsui et al. ................... 369/44.29 |
| 5,828,636 * | 10/1998 | Mutsumoto et al. ............. 369/44.35 |

\* cited by examiner

*Primary Examiner*—Thang V. Tran
(74) *Attorney, Agent, or Firm*—Finnegan, Henderson, Farabow, Garrett & Dunner L.L.P.

(57) ABSTRACT

An apparatus and method for automatically controlling the focusing of a compact disc player (CDP) performs more reliable automatic control operation upon abnormal conditions of a disc, such as a scratch and dust. The automatic focus controlling apparatus includes a pickup assembly for reading recorded data from a disc; and RF signal converter for converting the output signal read by the pickup assembly into an RF signal; a signal separator for separating a signal corresponding to a 3T component from the RF signal; a phase comparator for comparing the separated 3T signal with a predetermined frequency to provide a phase difference value; and a controller for controlling a focusing operation of an objective lens based on the phase difference value to provide a focus control signal.

13 Claims, 7 Drawing Sheets

APPARATUS FOR AUTOMATICALLY ADJUSTING FOCUS OFFSET AND METHOD THEREOF IN A DISC PLAYER

This application is a continuation-in-part of U.S. Patent application Ser. No. 08/927,016 filed Sep. 16, 1997 now U.S. Pat. No. 6,028,825. Applicants claim hereby claim priority to U.S. Pat. application No. 08/927,016, under 35 U.S.C. § 120 and § 365(c) of any PCT INTERNATIONAL applications designating the United States. Applicants hereby incorporate U.S. Patent application Ser. No. 08/927, 016 in its entirety by refernce.

BACKGROUND OF THE INVENTION

A. Field of the Invention

The present invention relates to an automatic focus offset adjustment in a disc player, and more particularly to an automatic focus offset adjusting apparatus and method of a disc player for performing a reliable automatic controlling operation with respect to an abnormal condition of a disc such as a scratch or dust.

B. Description of the Prior Art

FIG. 1 is a functional block diagram showing a generally conventional compact disc player. Referring to FIG. 1, a pickup assembly 2 reads out data from a disc 1 to provide an electric signal. A RF signal generator 3 receives the electric signal supplied from pickup assembly 2 to produce a RF signal. The RF signal from RF signal generator 3 is amplified by a predetermined level in a RF amplifier 4, and is waveform-shaped in an analog waveform shaping part 5. Thereafter, the signal from analog waveform shaping part 5 is supplied to a digital signal processor 6 to be subjected to demodulating and decoding processing, thereby reproducing information recorded on disc 1.

Meanwhile, the output signal from pickup assembly 2 is provided to a focus error detector 7 and a track error detector 8. Focus error detector 7 detects a focus error signal FE from the signal supplied from pickup assembly 2 to provide the detected focus error signal to a servo controller 9. Track error detector 8 detects a track error signal TE from the signal supplied from pickup assembly 2 to provide the detected track error signal to servo controller 9.

Then, servo controller 9 receives focus error signal FE and track error signal TE respectively from focus error detector 7 and track error detector 8 to provide a focus control signal FC and a track control signal TC. A motor drive 10 receives focus control signal FC and track control signal TC to drive a slide motor 11, thereby transferring pickup assembly 2 up and down and side to side. Also, servo controller 9 controls a spindle motor 12 via motor driver 10 to rotate disc 1 at a predetermined speed.

FIG. 2 is a view showing a construction of the pickup assembly 2 of FIG. 1. As shown in FIG. 2, pickup assembly 2 has a laser diode 21 for radiating laser beam, and a collimator lens 22 for converting the diverging beam into parallel rays. In addition, a beam splitter 23 separates incident light and reflected light, and a quarter-wave plate 24 changes a polarized plane of the reflected light by 90 degrees. An objective lens 25 focuses the light, and a photodetector 26 converts the light from beam splitter 23 into an electric signal. Further, a focusing coil and a tracking coil (not shown) are disposed around objective lens 25.

Current flowing through the focusing coil applies a force in conformity with the Fleming's left hand law, and objective lens 25 attached to the coil is moved up and down to perform the focusing. Also, by current flowing through the track coil, objective lens 25 is moved side to side to perform the tracking.

To begin with, the laser beam produced from laser diode 21 is transformed into the parallel rays from the diverging beam by passing through collimator lens 22. At this time, a beam-splitting diffraction grating (not shown) is interposed between laser diode 21 and collimator lens 22. When the laser beam generated from laser diode 21 passes through the diffraction grating, three beams consisting of one main spot and two side spots are produced.

After this, the parallel rays from collimator lens 22 are focused onto objective lens 25 via beam splitter 23 and quarter-wave plate 24. Successively, objective lens 25 generates the beam spot to emit it to disc 1. The beam spot emitted from objective lens 25 is reflected from disc 1 to return to objective lens 25, and the reflected beam is to changed into parallel rays via objective lens 25. The parallel rays pass though quarter-wave plate 24 to advance toward beam splitter 23. Then, beam splitter 23 shifts the advancing direction of the parallel rays by as much as 90 degrees to permit the parallel rays to proceed toward photodetector 26.

FIG. 3 is a block diagram for illustrating a general principle of generating the RF signal, focus error signal FE and track error signal TE. Photodetector 26 includes four light-receiving devices A, B, C and D for receiving the main spot and two light-receiving devices E and F for receiving the side spots. Four light-receiving devices A, B, C and D convert the received light into electric signals and supply them to RF signal generator 3 and focus error detector 7. RF signal generator 3 sums the signals from light-receiving devices A, B, C and D to provide a sum signal A+B+C+D. The sum signal is used as the RF signal. The signals from light-receiving devices A, B, C and D are also provided as a difference signal (A+C)–(B+D) via focus error detector 7. The difference signal is used as focus error signal FE.

Light-receiving devices E and F receive the side spots to convert them into the electric signals. The signals from light-receiving devices E and F produce a difference signal E-F via track error detector 8. The difference signal E-F is used as track error signal TE. Thereafter, servo controller 9 receives focus error signal FE and track error signal TE to produce focus control signal FC and track control signal TC.

FIG. 4 is a block diagram for illustrating a conventional focus offset adjusting method. As is illustrated, servo controller 9 receives focus error signal FE to generate focus control signal FC. At this time, in order to provide accurate focus control signal FC, a variable resistor VR is manually regulated by a user to adjust a focus offset to generate focus control signal FC.

Furthermore, since the specific disc is adjusted only once in its fabricating line, the conventional method has the disadvantage of being incapable of obtaining the accurate focus offset value associated with the kind or state of the disc.

SUMMARY OF THE INVENTION

The present invention is devised to solve the foregoing disadvantages of the prior art. Therefore, it is an object of the present invention to provide an automatic adjusting apparatus of a focus offset for performing a more reliable automatic controlling operation with respect to abnormal conditions of a disc, such as a scratch and dust.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the above object of the present invention, according to one aspect of the present invention, an automatic focus offset adjusting apparatus, as broadly defined and embodied herein, includes pickup means for reading recorded data from the disc, means for detecting a focus error signal from an output signal read by the pickup means, means for converting an output signal read by said pickup means into a RF signal, means for separating a specific component from said RF signal, means for comparing the separated specific component from said separating means with a signal having a predetermined frequency to provide a phase difference value, and means for controlling a focus operation of an objective lens by varying a focus offset value within a predetermined range of the phase difference value, setting an optimal focus offset value within the predetermined range, adding the optimal focus offset value to the focus error signal, and providing the added signal as a focus control signal to drive the objective lens.

According to another aspect of the present invention, an automatic focus controlling method of a disc player, as broadly defined and embodied herein, includes initializing the focusing operation based on an initial focus offset data stored in memory during a focusing initial operation or reset operation, separating a specific component signal from a RF signal associated with the initial focus offset data, comparing the separated specific signal with a reference signal having a predetermined frequency to provide a phase difference value, varying the focus offset value to allow the phase difference value to have a value within a predetermined range, obtaining an optimal focus offset value within the predetermined range, adding the optimal focus offset value to a focus error signal obtained from the RF signal, and providing the added signal as a focus control signal for controlling the focus operation.

It is to be understood that both the foregoing general description and the following detailed description are exemplary and explanatory only and are not restrictive of the invention, as claimed.

The accompanying drawings, which are incorporated in and constitute a part of this specification, illustrate one embodiment of the invention and together with the description, serve to explain the principles of the invention.

BRIEF DESCRIPTION OF THE DRAWINGS

Reference will now be made in detail to the present preferred embodiment of the invention, an example of which is illustrated in the accompanying drawings. Wherever possible, the same reference numbers will be used throughout the drawings to refer to the same or like parts.

The above objects and other advantages of the present invention will become more apparent by describing in detail preferred embodiments thereof with reference to the attached drawings in which.

DETAILED DESCRIPTION OF THE PREFERRED EMBODIMENT

An automatic focus offset adjusting apparatus according to the present invention will be described in detail with reference to the accompanying drawings.

Figure 1:
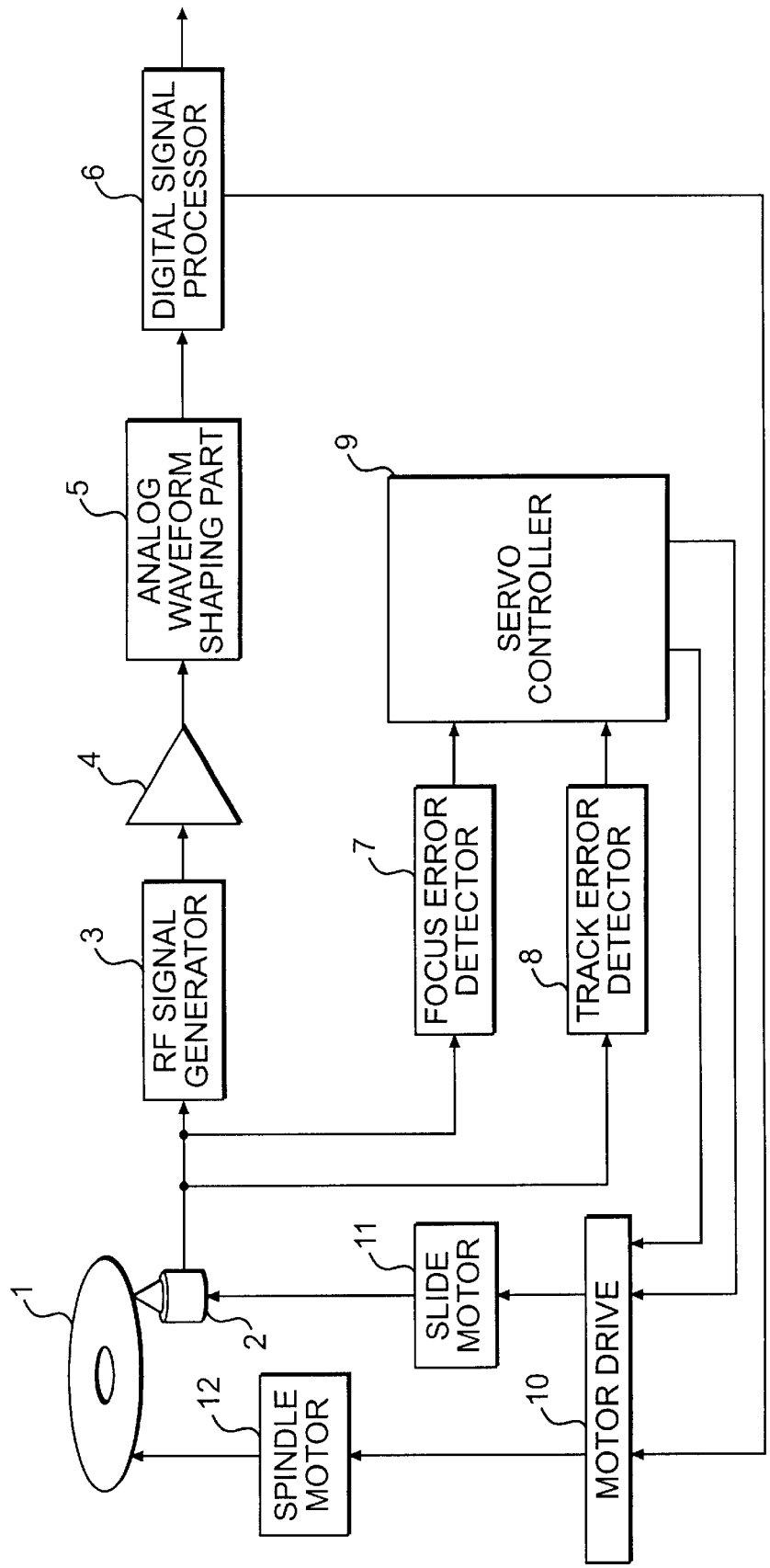
FIG. 1 is a functional block diagram showing a generally conventional compact disc player.
Figure 2:
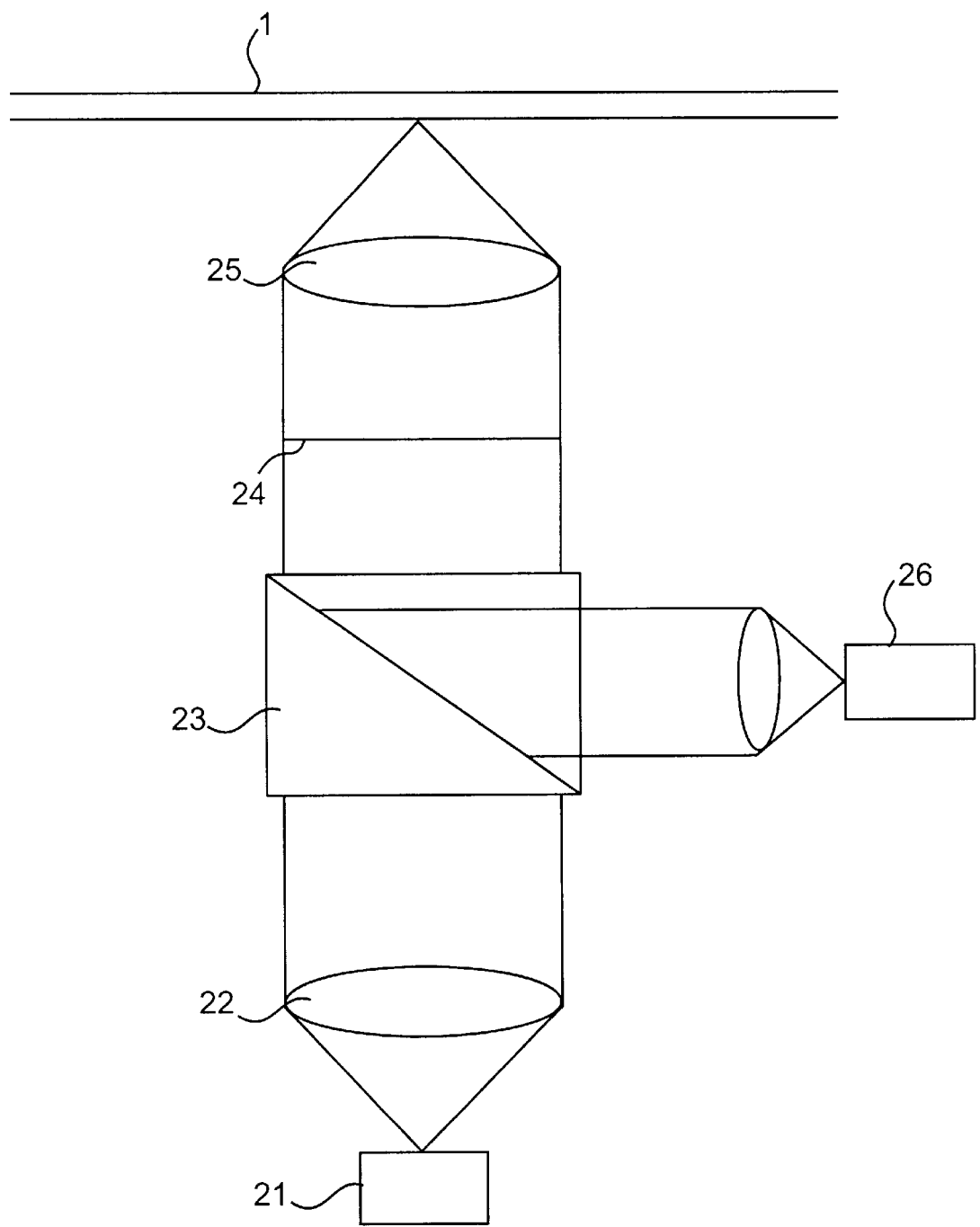
FIG. 2 is a view showing a construction of the pickup assembly of FIG. 1.
Figure 3:
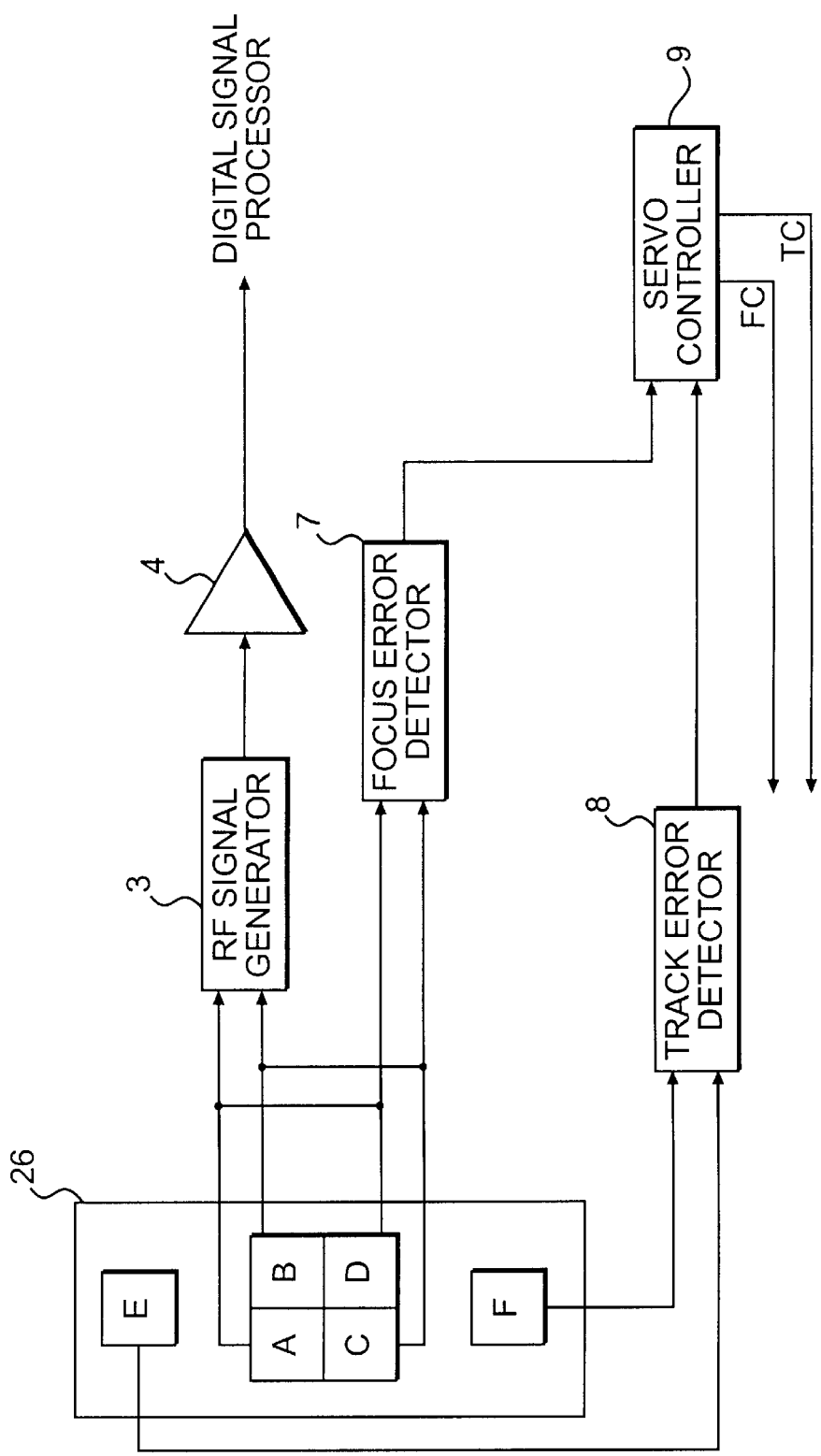
FIG. 3 is a block diagram for illustrating a general principle of producing a focus error signal and a track error signal.
Figure 4:
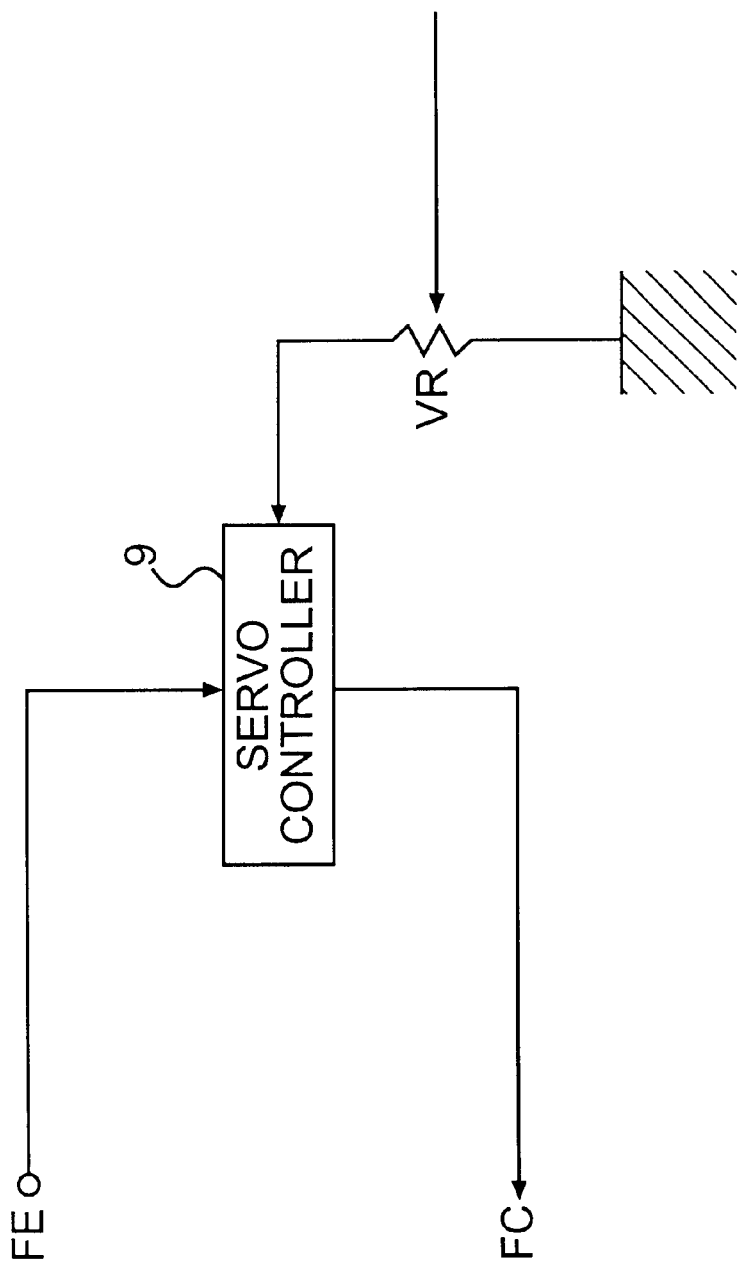
FIG. 4 is a block diagram for illustrating a conventional focus offset adjusting method.
Figure 5:
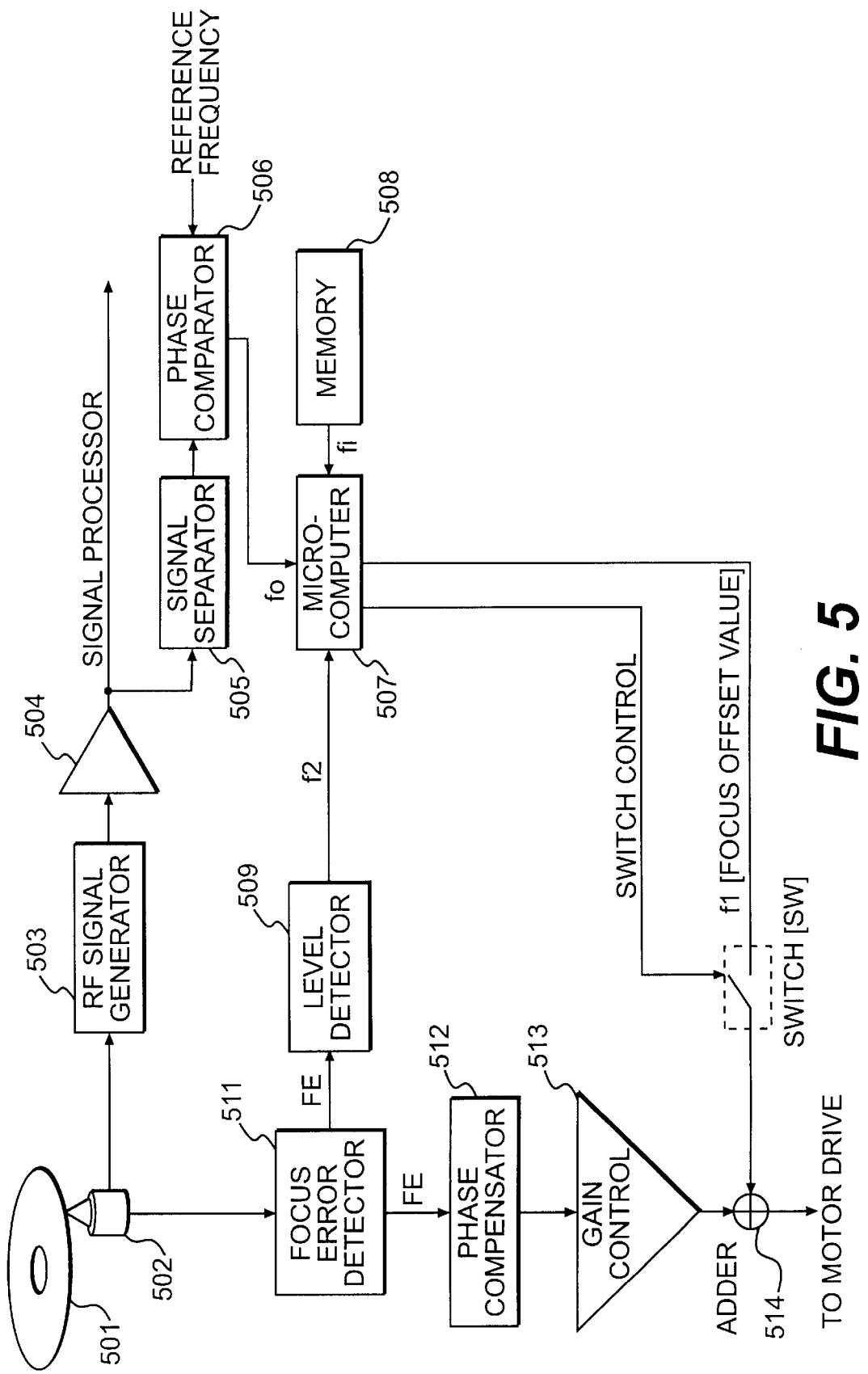
FIG. 5 is a block diagram showing an automatic focus offset adjusting apparatus according to an embodiment of the present invention.

FIG. 5 is a block diagram showing the automatic focus offset adjusting apparatus according to the present invention. As shown in FIG. 5, a pickup assembly 502 reads data from a disc 501 to provide an electric signal. A RF signal generator 503 receives the electric signal supplied from pickup assembly 502 to produce a RF signal. The RF signal from RF signal generator 503 is amplified via a RF amplifier 504 to advance toward a signal processor. Also, the signal from RF amplifier 504 is provided into a signal separator 505 which in turn separates only a 3T signal in the RF signal so as to measure the jitter. For reference, a recording unit of the disc is pit, and one pit is; 3T to 11T or so. Here, 3T becomes 744 mm since IT is 258 mm.

The signal from signal separator 505 is supplied into a phase comparator 506 which then compares the signal from signal separator 505 with a reference voltage to provide an error signal $f_O$ Thereafter, error signal $f_O$ from phase comparator 506 is provided to a microcomputer 507. In turn, microcomputer 507 receives error signal (phase difference value) $f_O$, from phase comparator 506, initial focus offset value fi stored in a memory 508a and a signal from a level detector 509 to provide a focus offset value f1 and switch control signal. At this time, initial focus offset value $f_i$, is a current or voltage value, which is stored in memory 508 at the initial stage, and applied to a focusing coil (not shown).

Meanwhile, the electric signal from pickup assembly 502 is supplied into a focus error detector 511. After receiving the electric signal from pickup assembly 502, focus error detector 511 provides a focus error signal FE to a phase compensator 512 and level detector 509.

Phase compensator 512 receives focus error signal FE to generate phase-compensated focus error signal FE. Then, phase-compensated focus error signal FE from phase compensator 512 is supplied into an amplifier 513 to be gain-controlled. Amplifier 513 is connected with an adder 514.

Adder 514 adds a focus offset value f1 via a closed switch SW from microcomputer 507 to an output of amplifier 513, i.e., phase-compensated and gain-controlled focus error signal.

Additionally, level detector 509 detects the level of focus error signal FE, and provides its output signal f2 to microcomputer 507.

According to the above construction of this invention, initially, pickup assembly 502 is driven by initial focus offset value $f_i$, stored in memory 508.

RF signal of RF signal generator 503 which is changed according to initial driving of pickup assembly 502 is supplied, via RF amplifier 504 and signal separator 505, into phase compensator 506 which compares the signal from signal separator 505 with the reference voltage to provide the error signal (phase difference value) $f_O$. Thereafter, the error signal $f_O$ from phase comparator 506 is provided to microcomputer 507.

In turn, microcomputer 507 determines whether the phase difference value $f_O$, is within a predetermined threshold n or not, and if so, varies initial focus offset value $f_i$, by $\pm\Delta$.

After this, microcomputer 507 obtains a new $f_O$, corresponding to $f1=f_i\pm\Delta$.

Figure 7:
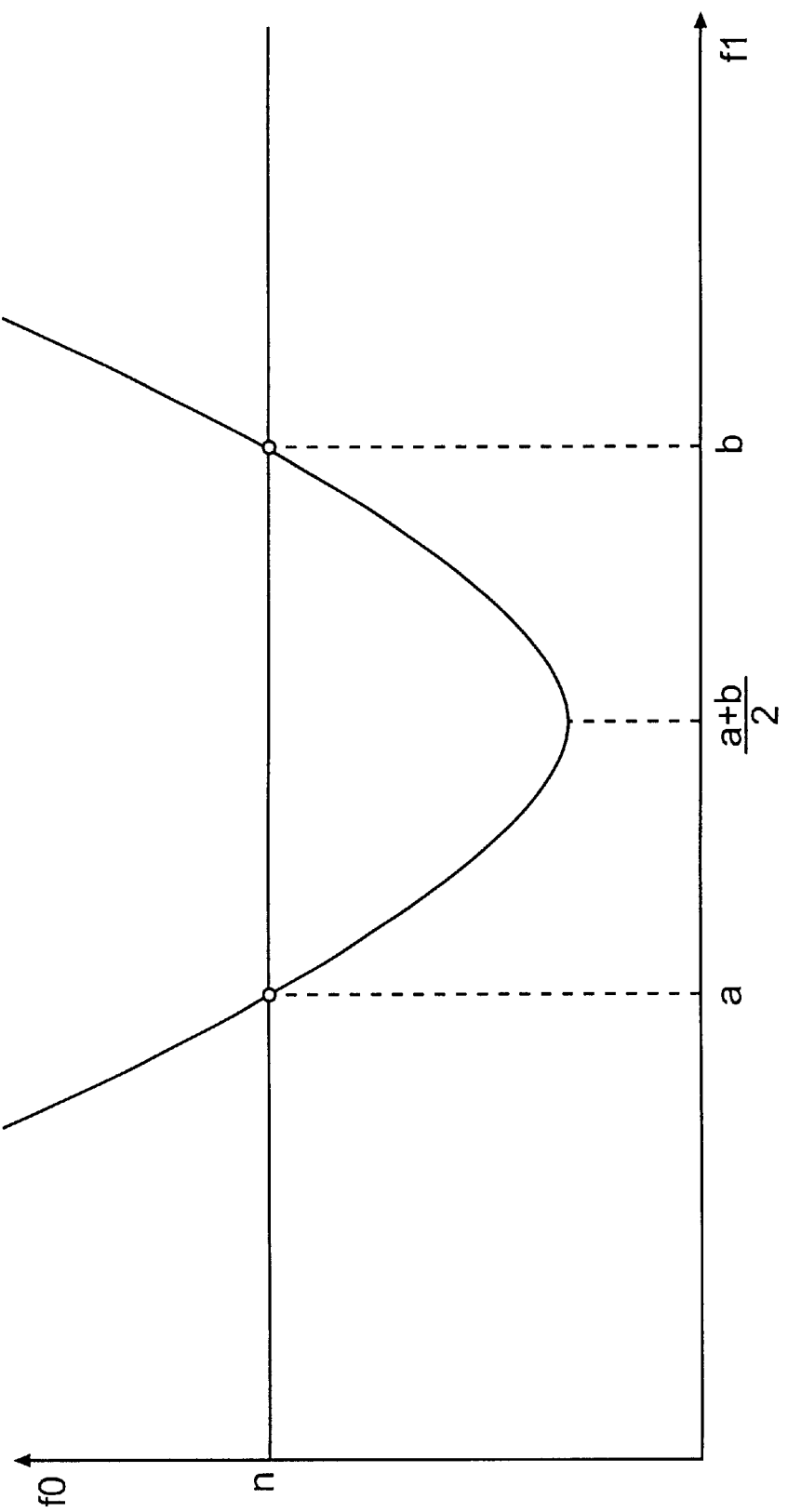
FIG. 7 is a diagram for explaining selection of an optimal focus offset value.

Then, microcomputer 507 determines whether a level f2 of focus error signal FE from level detector 509 is lower than a predetermined level, if so, sets a lower limit of f focus offset value f1 as minimum value a and an upper limit of focus offset value f1 as maximum value b in accordance with the $f_O$, within the threshold value n, obtains an average value of minimum value a and maximum value b as optimal focus offset value as shown in FIG. 7, and outputs the optimal focus offset value to adder 514 via switch SW to add the optimal focus offset value to phase-compensated and gain-controlled focus error signal.

Figure 6:
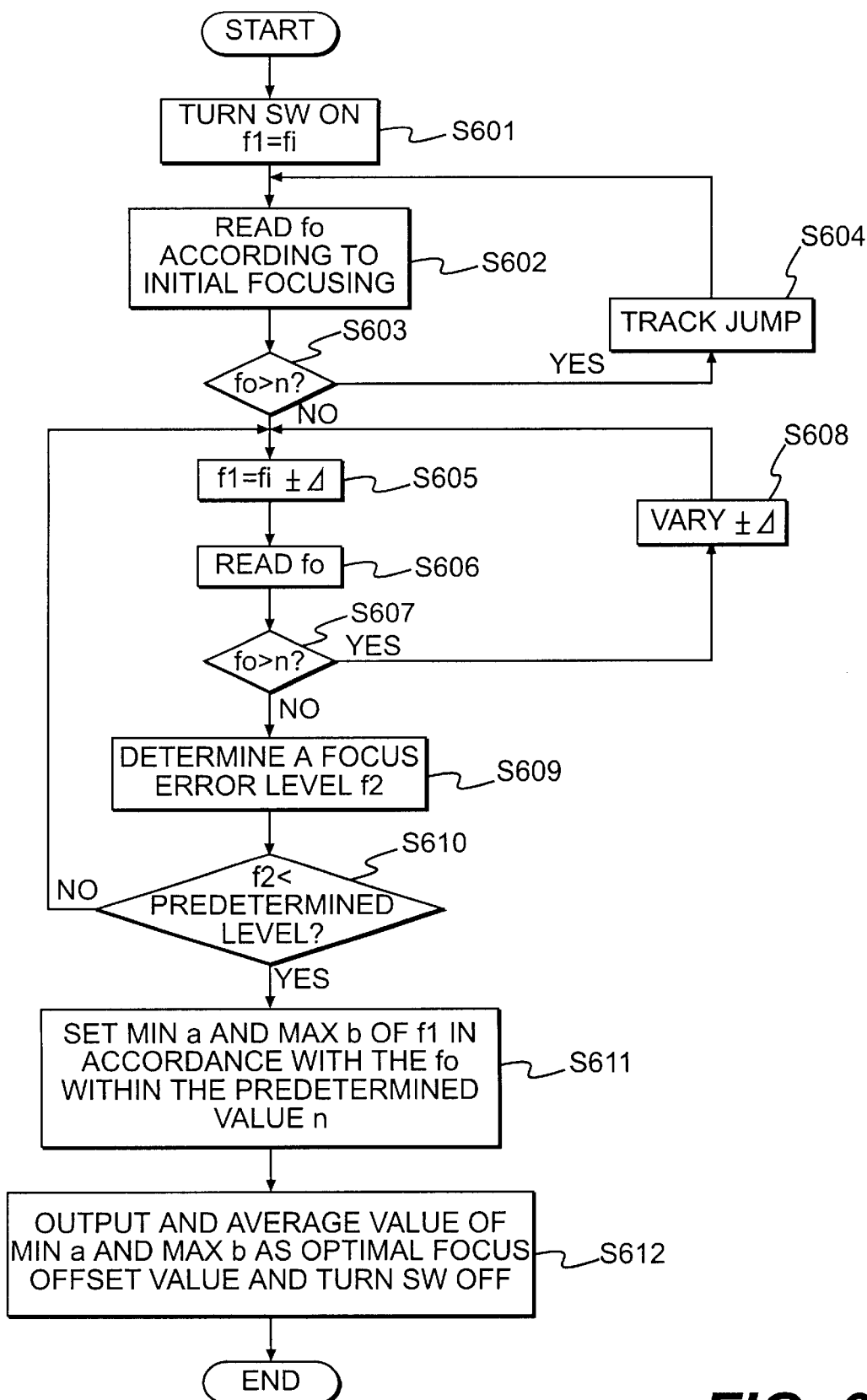
FIG. 6 is a flowchart for explaining an automatic focus offset adjusting method according to the embodiment of the present invention.

FIG. 6 is a flowchart for explaining an automatic focus offset adjusting method according to the present invention. As illustrated, in step S601, microcomputer 507 sits a focus mode, e.g, focusing initial mode or reset mode turns switch SW on and outputs initial focus offset value fi stored in memory 508 as focus offset value f1, via switch SW and adder 514, to motor drive for initial focusing drive.

In step S602, pickup assembly 502 is moved upward or downward, and the RF signal from pickup assembly 502 is changed. The changed RF signal generates new error signal $f_O$ via signal separator 505 and phase comparator 506, and output error signal $f_O$ is supplied into microcomputer 507.

In step S602, microcomputer 507 controls phase comparator 506 to compare the input 3T signal with reference voltage Vref thereby producing error signal (phase difference value) $f_O$. Then, microcomputer 507 determines, in step S603, whether error signal $f_O$ is higher than the predetermined threshold n or not. The program proceeds to) step S604 when error signal $f_O$ is higher than the threshold n. If not, the program proceeds to step S605.

In step S603, if it is determined that error signal $f_O$ exceeds the threshold n, microcomputer 507 determines that the focusing is impossible and jumps the track in step S604.

In step S605, microcomputer 507 adds a predetermined value $\pm\Delta$ to initial focus offset value $f_i$, and the obtained value $f_i\pm\Delta$ is provided as a new focus offset value f1. Then, in step S606, microcomputer 507 obtains a new $f_O$ corresponding to $f1=f_i\pm\Delta$.

After that, microcomputer 507 determines whether the new $f_O$ is lower than the threshold n or not.

The program proceeds to step S608 when the new $f_O$ is lower than the threshold n. If not, the program proceeds to step S609. In step S608, the microcomputer 507 varies $\pm\Delta$. Then, the microcomputer 507 proceeds to step S605 to repeat steps S605 to S607.

Additionally, microcomputer 507 controls level detector 509 to detect the level f2 of focus error signal FE in step S609.

In step S610, microcomputer 507 receives the signal f2 supplied from level detector 509 to determine whether the signal f2 has a level below a predetermined value or not. If it is determined that the signal f2 is below the predetermined level, microcomputer 507 proceeds to step S611. Otherwise, it proceeds to step S605 to repeat steps S605 to S610.

Then, in step S611, microcomputer 507 sets minimum value a and maximum value b of focus offset value f1 in accordance with $f_O$, within the threshold value n as shown in FIG. 7. After that, in step S612, microcomputer 507 outputs an average ((a+b)2 of FIG.7) of minimum value a and maximum value b as focus offset value f1 and turns switch SW off. Then, the program is finished.

As described above, the automatic focus offset adjusting apparatus and method according to the present invention is effective in that the focus offset is automatically adjusted to eliminate the error liable to be incurred during the manual controlling. At the same time, the focus offset is automatically adjusted to be stable with respect to warping of the disc and a mechanical error of the pickup in the disc player. Furthermore, the pickup signal obtained when the disc is in an abnormal condition due to dust or scratch is distinguishable to be advantageous for enhancing reliability of the focus offset adjusting operation.

Still furthermore, in detecting of the optimal focus offset level, the present invention can reduce computation time by detecting only maximum & minimum levels and setting an average of the maximum and minimum levels as an optimal focus offset value, compared to prior methods in which computation should be required for all the values of focus bias.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An apparatus for automatically adjusting focus offset in a disc player comprising:

pickup means for reading recorded data from a disc in the disc player;

means for detecting a focus error signal from an output signal read by the pickup means;

means for converting an output signal read by said pickup means into a RF signal;

means for separating a specific component from said RF signal;

means for comparing the separated specific component from said separating means with a signal having a predetermined frequency to provide a phase difference value;

means for controlling a focus operation of an objective lens by varying a focus offset value within a predetermined range of the phase difference value, setting an optimal focus offset value within the predetermined range, adding the optimal focus offset value to the focus error signal, and providing the added signal as a focus control signal to drive the objective lens; and means for detecting a signal level of said focus error signal. wherein the optimal focus value is set within the predetermined range based on the level of said focus error signal.

2. The apparatus for automatically adjusting focus offset in a disc player as in claim 1, further comprising means for storing an initial focusing offset data value for controlling an initial focusing operation of the controlling means.

3. The apparatus for automatically adjusting focus offset in a disc player as in claim 1, further comprising switching means for stopping the output of said controlling means after the optimal focus offset value is provided for the addition.

4. The apparatus for automatically adjusting focus offset in a disc player as in claim 1, wherein said controlling means obtains maximum and minimum values of the focus offset values within the predetermined range and sets an average value of the maximum and minimum values as the optimal focus offset value.

5. The apparatus for automatically adjusting focus offset in a disc player as in claim 1, wherein if the phase difference value from the comparing means is higher than a predetermined value, the track on which focus operation has been performed is regarded as an abnormal condition, the focus operation is jumped into a predetermined other track and the comparison of the comparing means is performed based on the RF signal of the predetermined other track.

6. A method for automatically controlling focus operation in a disc player comprising:

initializing the focusing operation based on an initial focus offset data stored in memory during a focusing initial operation or reset operation;

separating a specific component signal from a RF signal associated with the initial focus offset data;

comparing the separated specific signal with a reference signal having a predetermined frequency to provide a phase difference value;

varying a focus offset value to allow the phase difference value to have a value within a predetermined range;

detecting a level of a focus error signal and determining whether the level of the focus error signal falls within a predetermined range, obtaining an optimal focus offset value within the predetermined range based on the result of said detecting and determining steps:

adding the optimal focus offset value to the focus error signal; and providing the added signal as a focus control signal for controlling the focus operation.

7. The method for automatically controlling focus operation in a disc player as in claim 6, wherein said optimal focus offset value is an average value of maximum and minimum values in said predetermined range.

8. An apparatus for automatically adjusting a focus offset in a disc player including an optical pickup to read recorded data at a first point of a disc, a focus error detector to detect a focus error signal from the output signal read by said optical pickup, and focus control unit to minimize said focus error signal, comprising:

a converter to convert an output signal read by said optical pickup into a RF signal;

a separator to separate a specific component from said RF signal;

a comparator to compare the separated specific component from said separator with a signal having a predetermined frequency to provide a phase difference value;

a level detector to detect a level of said focus error signal; and a control unit to adjust focus offset based on said phase difference value and said level of said focus error signal whereby the focus offset is varied to allow said detected phase difference to have a value within a prescribed range, and an optimum focus offset value is obtained within the prescribed range.

9. The apparatus as recited in claim 8, wherein the control unit controls the optical pickup to move to a second point of the disc when abnormal conditions are detected, and then to perform an operation for adjusting the focus offset at the first point.

10. The apparatus of claim 9, further wherein an abnormal condition is determined when an output of said level detector is above a prescribed level.

11. The apparatus of claim 9, further wherein an abnormal condition is determined when an output of said comparator is above a prescribed level.

12. The apparatus of claim 8, wherein said control unit obtains maximum and minimum values of the focus offset values within the prescribed range and sets an average value of the maximum and minimum values as the optimum focus offset value.

13. An apparatus for automatically adjusting a focus offset in a disc player including an optical pickup to read data recorded in the disc, a focus error detector to detect a focus error signal from the output signal read from the optical pickup, and a focus control unit to minimize said focus error signal, comprising:

a converter to convert an output signal read from said optical pickup into a RF signal;

a separator to separate a specific component from said RF signal;

a comparator to compare the separated specific component from said separator with a signal having a predetermined frequency to provide a phase difference value; and a control unit to adjust focus offset based on said phase difference value and a level of said focus error signal, wherein the focus offset is varied to allow said detected phase difference to have a value within a prescribed range, and maximum and minimum values of the focus offset are obtained within the prescribed range, and to set an average value of maximum and minimum value as an optimum focus offset value.

* * * * *